US007677751B2

(12) United States Patent
Kinsman et al.

(10) Patent No.: US 7,677,751 B2
(45) Date of Patent: Mar. 16, 2010

(54) HANDS FREE MAGNIFICATION EYEWEAR

(76) Inventors: William E. Kinsman, 2504 Arundel Dr. SE., East Grand Rapids, MI (US) 49506; Robert E. O'Brien, 6138 Rogue River Meadows Dr. NE., Plainfield Township, MI (US) 49306; David J. O'Brien, 7103 Oran Dr. SE., Grand Rapids, MI (US) 49546

( * ) Notice: Subject to any disclaimer, the term of this patent is extended or adjusted under 35 U.S.C. 154(b) by 68 days.

(21) Appl. No.: 11/598,518

(22) Filed: Nov. 13, 2006

(65) Prior Publication Data

US 2007/0153501 A1 Jul. 5, 2007

Related U.S. Application Data

(63) Continuation-in-part of application No. 10/667,061, filed on Sep. 17, 2003, now abandoned.

(60) Provisional application No. 60/411,895, filed on Sep. 19, 2002.

(51) Int. Cl.
*F21V 21/084* (2006.01)

(52) U.S. Cl. .................. 362/105; 362/106; 362/139

(58) Field of Classification Search ................. 362/103, 362/105, 106, 109, 138, 139, 142, 190, 191, 362/208, 287, 396, 427; 351/57, 155, 158
See application file for complete search history.

(56) References Cited

U.S. PATENT DOCUMENTS

| 1,144,087 | A | * | 6/1915 | Adler | 362/191 |
| 1,556,510 | A | * | 10/1925 | King | 362/105 |
| 2,052,654 | A | * | 9/1936 | Panoth | 362/191 |
| 3,011,399 | A | * | 12/1961 | Pfleger | 362/199 |
| 4,572,180 | A | * | 2/1986 | Deenadayalu | 606/161 |
| 5,412,896 | A | * | 5/1995 | Morgan | 362/108 |
| 6,116,729 | A | * | 9/2000 | Huang | 351/158 |
| 6,986,590 | B1 | * | 1/2006 | Padden | 362/398 |
| 7,048,403 | B2 | * | 5/2006 | Parker et al. | 362/105 |
| 2004/0020509 | A1 | * | 2/2004 | Waisman | 362/135 |

* cited by examiner

*Primary Examiner*—Y My Quach Lee
(74) *Attorney, Agent, or Firm*—Price, Heneveld, Cooper, DeWitt & Litton, LLP

(57) ABSTRACT

A hands free magnification device is provided that is capable of illuminating an area adjacent the user. A method of use of the device is also provided.

2 Claims, 3 Drawing Sheets

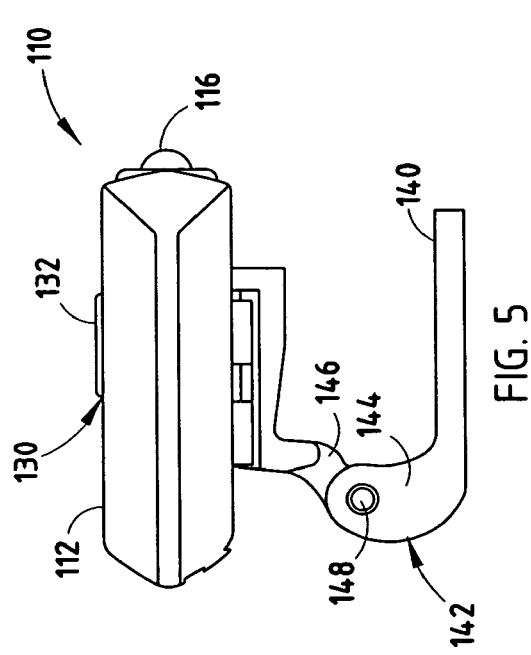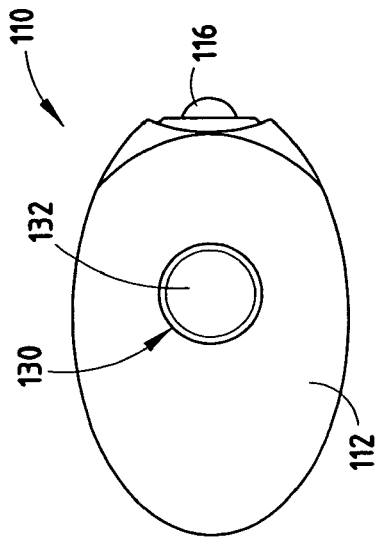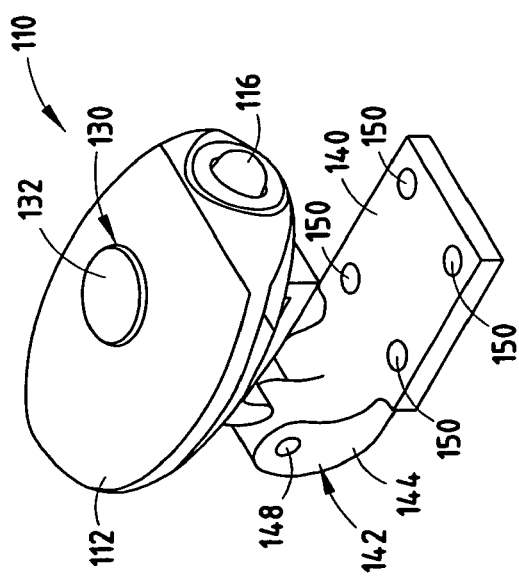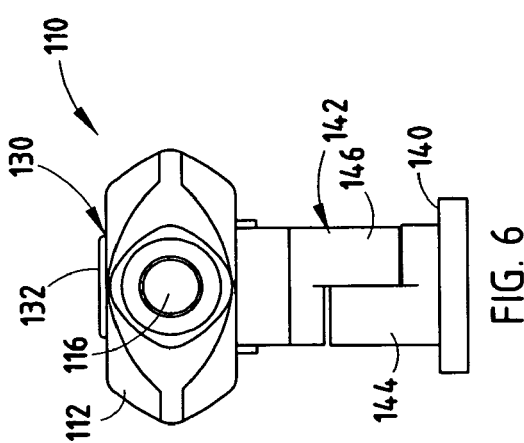

HANDS FREE MAGNIFICATION EYEWEAR

CROSS-REFERENCE TO RELATED APPLICATIONS

This application is a continuation-in-part of and claims the benefit of U.S. patent application Ser. No. 10/667,061, filed on Sep. 17, 2003, now abandoned which claims the benefit of U.S. Provisional Patent Application No. 60/411,895, filed on Sep. 19, 2002, the disclosure of which is hereby incorporated by reference in its entirety.

BACKGROUND OF THE INVENTION

The present invention relates to magnifying devices and more specifically to magnifying devices that assist in illuminating an object desired to be viewed.

Small objects are difficult to view without magnification, and especially so for persons with deteriorating or already deteriorated vision. Such objects are even more difficult to view when ample light is not available to assist in viewing the object. Furthermore, when both hands of the viewer are needed to handle or maneuver the object, viewing the object is complicated even more because one hand can not be used to hold a flashlight and/or magnifying glass or spectacles. Ultimately, the viewer may be injured by handling sharp objects, or those objects where if they are mishandled injury may occur, in low light non-magnification conditions. Also, the viewer may not achieve the desired, or required, attention to detail in these low light non-magnification conditions.

For objects such as flies for fishing, attention to detail is necessary. It is very important to see the small details of the fly, while tying the fly. Therefore, for things such as tying flies for fishing and other circumstances, there is a need for an apparatus to assist in viewing an object by providing both illumination and magnification without needing the use of one's hands to hold it.

SUMMARY OF THE INVENTION

One aspect of the present invention is an illuminating magnifying device that comprises a housing that includes a fastener for attaching the illuminating magnifying device to another article. It also comprises a magnifier attached to the housing, and an illuminator attached to the housing which is adapted to illuminate an area adjacent to the illuminating magnifying device.

Another aspect of the present invention is a method for viewing an object adjacent to a person comprising the steps of: (a) providing an object adjacent to a person, the object being desired to be viewed by the person; (b) providing an illuminating magnifying device comprising a clip for securing the illuminating magnifying device near the person's eye, a magnifier, and an illuminator that switches on when magnifier is moved to an on position; (c) switching on the illuminator by moving the magnifier to the on position; and (d) viewing the object through the magnifier.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a perspective view of an illuminating device that is an aspect of the present invention;

FIG. 5 is a side elevational view of the illuminating device shown in FIG. 4;

FIG. 6 is a front elevational view of the illuminating device shown in FIG. 4; and FIG. 7 is a top plan view of the illuminating device shown in FIG. 4.

DETAILED DESCRIPTION OF PREFERRED EMBODIMENT

Figure 2:
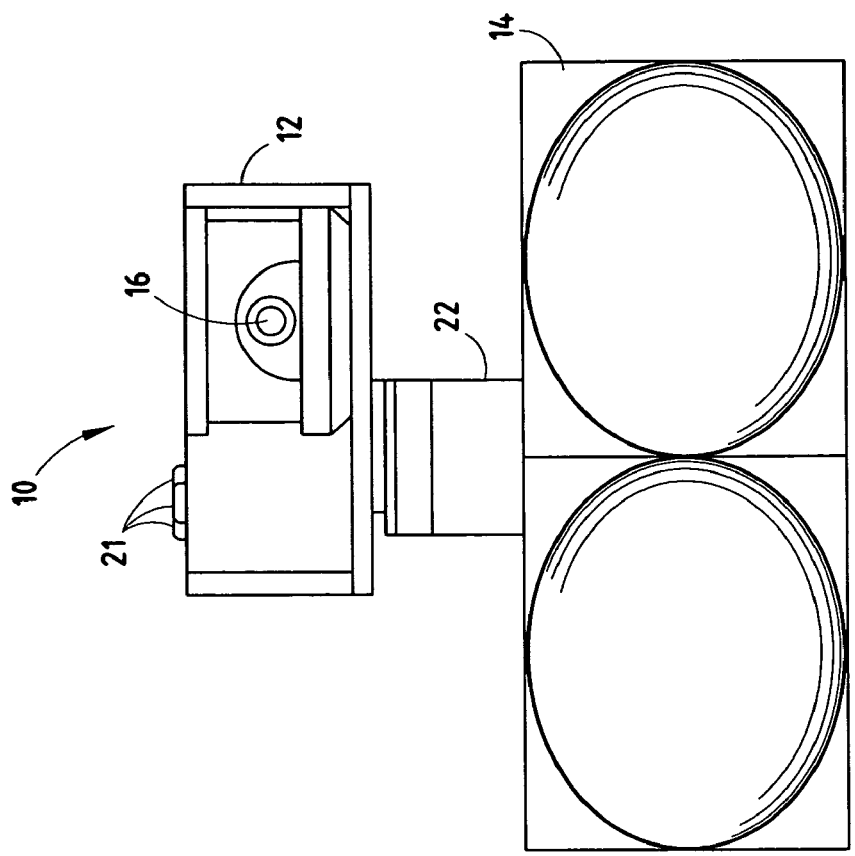
FIG. 2 is a front elevational view of the device shown in FIG. 1.

For purposes of description herein, the terms "upper," "lower," "right," "left," "rear," "front," "vertical," "horizontal," and derivatives thereof shall relate to the invention as oriented in FIG. 2, the front of the illuminating magnifying device facing out from the printed page. However, it is to be understood that the invention may assume various alternative orientations, except where expressly specified to the contrary. It is also to be understood that the specific device and process illustrated in the attached drawings, and described in the following description, are simply exemplary embodiments of the inventive concepts defined in the appended claims. Hence, specific dimensions or other physical characteristics relating to the embodiments disclosed herein are not to be considered as limiting, unless the claims expressly state otherwise.

Figure 1:
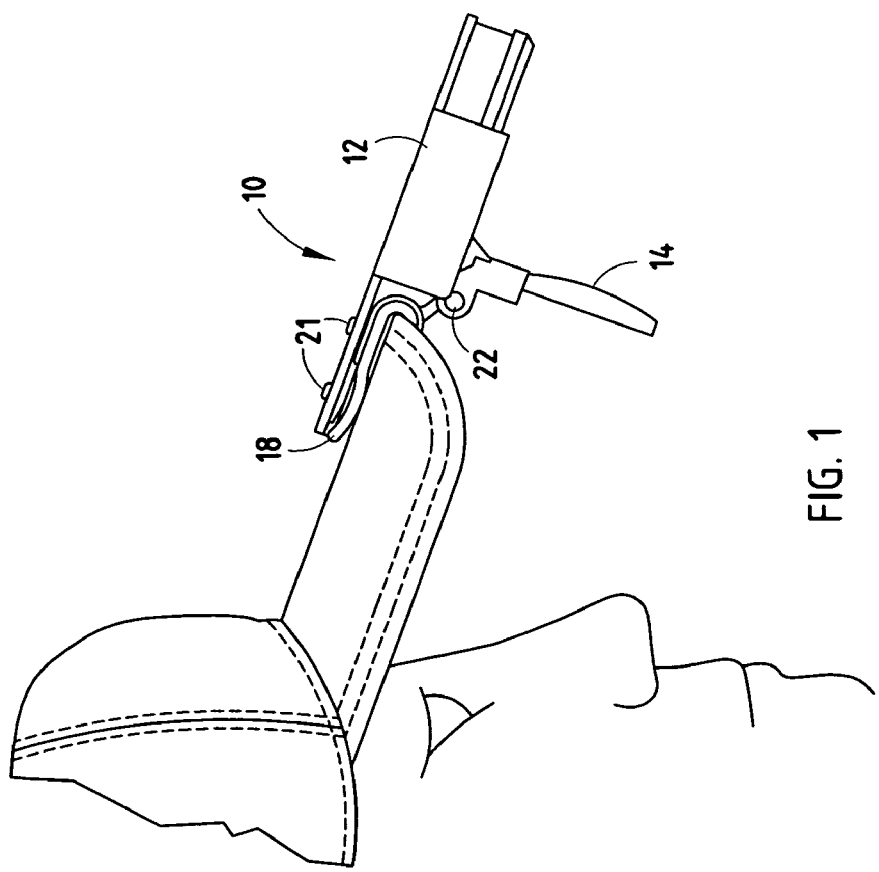
FIG. 1 is an elevational view of the illuminating magnifying device of the present invention in use.

FIG. 1 shows an illuminating magnifying device 10 generally including a housing 12, a magnifying glass 14, and a light 16 (see FIG. 2). Housing 12 is made of any durable substance, such as aluminum or rigid plastic, and is shaped and sized to contain light 16, a power source 17 such as a small battery (see FIG. 3) for light 16, means for attachment of the magnifying glass 14 to the housing 12, and a clip 18.

The illuminating magnifying device 10 may be secured to an article by any means, however, a clip is the preferred attachment means. This allows the illuminating magnifying device 10 to be easily and quickly removed and secured to other articles. Clip 18 is preferably made of a rigid plastic, although other materials such as various metals are contemplated. Clip 18 is located on one end of housing 12 and has a spring-like action so upon depressing bottom portion 20 of clip 18 downward, it opens further, allowing the device 10 be secured to another article such as a hat (see FIGS. 1 and 3). Clip 18 is preferably attached to housing 12 by screw(s) 21. Other attachment means may be used and these include a rivet and other types of fasteners. As noted above, housing 12 also has a light 16 therein. The light is preferably located generally toward the opposite end of the housing 12 from clip 18. Typically, housing 12 also includes a battery 17 to power the light and an on/off switch (discussed below) so that the light can be turned on and off when desired. The light 16 is preferably positioned so that it will illuminate an area in front of the illuminating magnifying device 10. The light 16 may include, but is not limited to, any type of battery powered, solar powered and/or a solar storage rechargeable powered light source.

Figure 3:
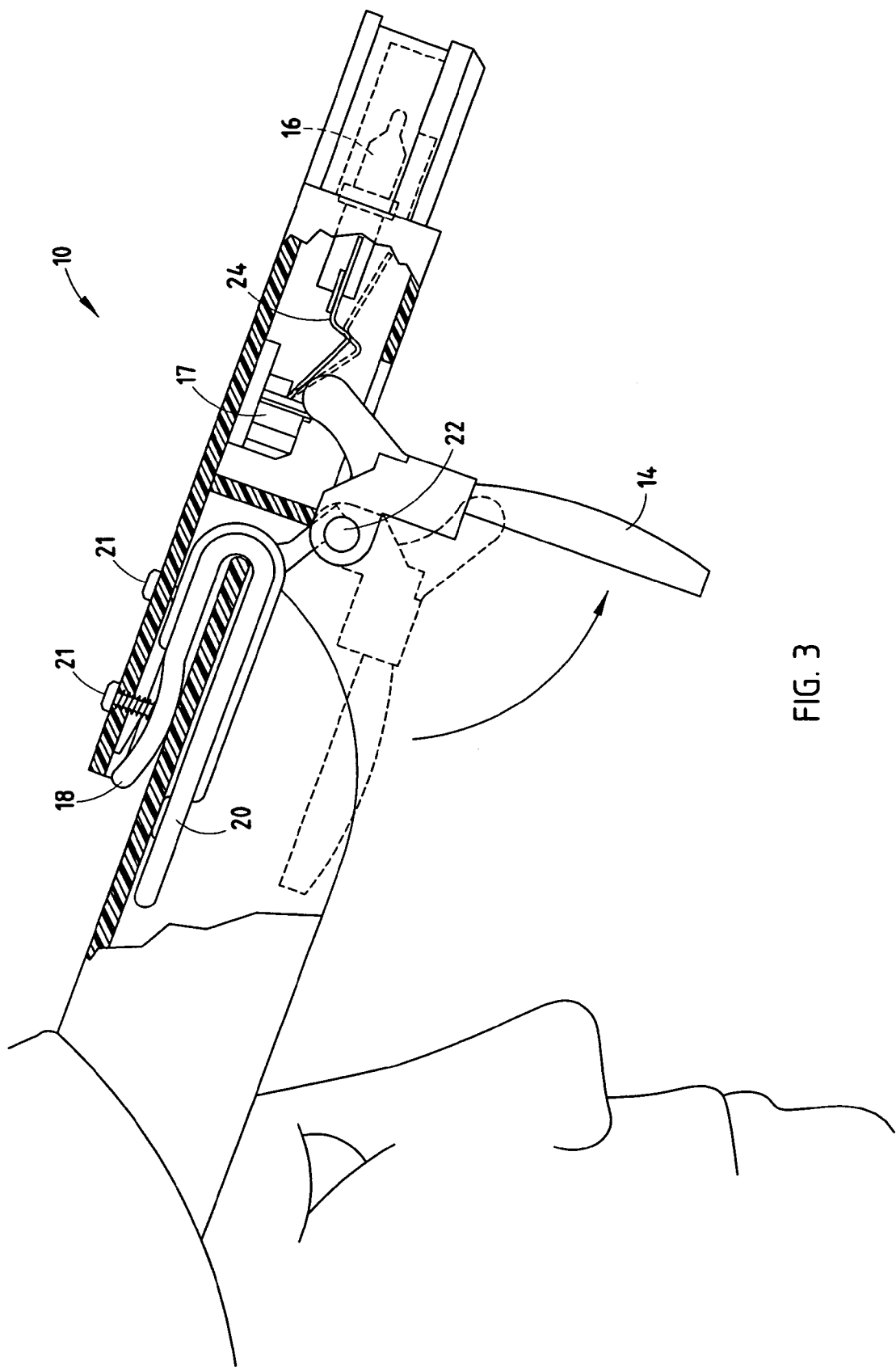
FIG. 3 is a side elevational view of the device shown in FIG. 1.

Magnifying glass 14 is attached to housing 12 by a hinge 22 (FIG. 3). FIG. 3 shows the magnifying glass 14 in two positions. Magnifying glass 14 can be in an up position so that its latitudinal axis is substantially parallel to the longitudinal axis of the housing 12, making it easier to store and transport. The magnifying glass 14 can be moved to a down position, putting the latitudinal axis of the magnifying glass 14 substantially perpendicular to the longitudinal axis of the housing 12. Hinge 22 is connected to an electric switch 24 so that when magnifying glass 14 is moved to the down position, the light 16 is turned on.

In operation, the illuminating magnifying device 10 is secured to an article near the user's eyes, for example such as a hat, visor, eyewear or another article to hold the device in place. The magnifying glass 14 is then flipped to its down position, positioning the magnifying glass 14 in front of the user's eyes and switching on the light 16. Light 16 illuminates the area in front of the user including the object desired to be viewed, making it easy to work and to use both hands for the object making it possible to see the object fully even if it is dark in the vicinity. Such a device allows the use of both hands and eliminates the need to hold such things as a flashlight under one arm or holding a magnifying glass up to a person's face. The illuminating magnifying device is small and easy to use and provides great benefits to outdoorsmen or others wanting to illuminate and magnify an object while using both hands.

FIGS. 4-7 depict a second embodiment of the invention. An illuminating device 110 is shown that generally includes a housing 112, a light 116, a switch 130, and a base 140. Housing 112 is preferably shaped to generally fit in a person's hand and small enough to be easily moveable, if desired. Housing 112 can be made of any suitable rigid or semi-rigid substance, such as polyethylene.

Enclosed partially within housing 112 is a light 116. The light 116 projects slightly from the front of housing 112, and is preferably an LED light or an incandescent light.

Also enclosed within housing 112 are the main portions of switch 130 and a battery (not shown). Switch 130 includes an exterior button 132, which can be pushed to flip the switch, thereby activating or deactivating light 116. A base 140 is attached to housing 112. Base 140 is attached to housing 112 via a stop hinge 142. Base 140 is preferably flat on its bottom and made of a rigid or semi-rigid substance (such as polyethylene), so that illuminating device 110 may sit on or be attached to a flat surface. Stop hinge 142 has two parts, a first member 144 and a second member 146, which are attached to each other via an axle 148. Members 144 and 146 are configured in such a way that housing 112, and thus light 116, can be tilted with respect to the longitudinal axis of base 140.

Base 140 preferably includes one or more apertures 150 that allow attachment to a surface, if desired. A fastener, such as a screw, may be used within the apertures to attach illuminating device 110 to a surface. The illuminating device 110 can also utilize other attachment means at the base 140, such as one or more magnets, VELCRO®, epoxy, or tape. Thus, illuminating device 110 can be attached to many different surfaces, and its size is such that it can be placed in a variety of locations so the user can have illumination in small, confined areas. This is especially useful for illuminating such things as machinery or electronics where it is desired to have both hands free.

In operation, illuminating device 110 is placed on a surface and/or attached to a surface. Housing 112, and thus light 116 can be tilted to the desired angle. Button 132 is pressed, turning switch 130 to the "on" position and completing the circuit, thereby turning light 116 on. Illuminating device 110 can be used in a variety of different places and attached to a variety of different surfaces, thus providing a great deal of flexibility to direct "hands-free" light where the user needs to see.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. An illuminating and magnifying device comprising:
a housing including an illuminating source and a switch;
a magnifier having a latitudinal axis and a longitudinal axis, the magnifier movably coupled to said housing;
a power source connected to the illuminating source, wherein said illuminating source is activated when said magnifier is moved from an unused position to a use position;
a hinge movably attaching said magnifier to the housing; and
a fastener attaching said housing to the bill of a headwear, such that an object in front of the wearer of the headwear is illuminated and magnified by said device.

2. A method for viewing an object adjacent to a person, comprising the steps of:
(a) providing an object adjacent to a person, the object desired to be viewed by the person;
(b) providing an illuminating magnifying device comprising a fastener for securing the illuminating magnifying device to an article near a person's eyes, a magnifier having a latitudinal axis and a longitudinal axis, and an illuminator that switches on when the magnifier is moved from a first position to a second position;
(c) switching on the illuminator by moving the magnifier to the second position; and
(d) viewing the object through the magnifier;
wherein the article is headwear having a bill.

* * * * *